Sept. 17, 1957  F. D. MARASSO  2,806,579
CONVEYOR LOADING MECHANISM
Original Filed Dec. 21, 1951  3 Sheets-Sheet 1

INVENTOR
FRED D. MARASSO
BY
ATTORNEY

Sept. 17, 1957 F. D. MARASSO 2,806,579
CONVEYOR LOADING MECHANISM
Original Filed Dec. 21, 1951 3 Sheets-Sheet 2

INVENTOR
FRED D. MARASSO
BY Bradley Cohn
ATTORNEY

Sept. 17, 1957 F. D. MARASSO 2,806,579
CONVEYOR LOADING MECHANISM
Original Filed Dec. 21, 1951 3 Sheets-Sheet 3

INVENTOR.
FRED D. MARASSO
BY Bradley Cohn
ATTORNEY

United States Patent Office 2,806,579
Patented Sept. 17, 1957

2,806,579

CONVEYOR LOADING MECHANISM

Fred D. Marasso, Joliet, Ill., assignor to Union Machinery Company, a corporation of Illinois Original application December 21, 1951, Serial No. 262,744, now Patent No. 2,750,899, dated June 19, 1956. Divided and this application May 22, 1956, Serial No. 586,452

12 Claims. (Cl. 198—31)

This invention is a division of application Serial No. 262,744, filed December 21, 1951, and now Patent No. 2,750,899, dated June 19, 1956, which relates to dividing, proofing, sheeting, molding and panning dough and dough products. This application relates to an invention for loading a conveyor. In particular, it relates to an invention for loading individual objects on a conveyor in regimented columns of a predetermined variable number.

In the bakery industry, in loading dough on a conveyor, as for example a proofer conveyor, it is usually desired to load the dough in series of three or series of four. Accordingly, it is an object of my invention to design a means for loading such a conveyor in a pre-selected series of three or four. It is obvious that the invention is not limited to loading any particular number or combination of alternate numbers.

It is a further object of the invention to design a device for selectively loading a conveyor with alternative predetermined numbers of objects regimented in columnar order.

It is thus an object of my invention to design a cross-feed moving transverse to the movement of a conveyor and to simultaneously deposit on the conveyor a selected number of such objects.

The novel features which I believe to be characteristic of my invention are set forth with particularity in the appended claims. My invention itself, however, both as to its organization and operation may be understood by reference to the apparatus embodying the invention and shown in the following description taken with the accompanying drawings in which:

Figure 1:
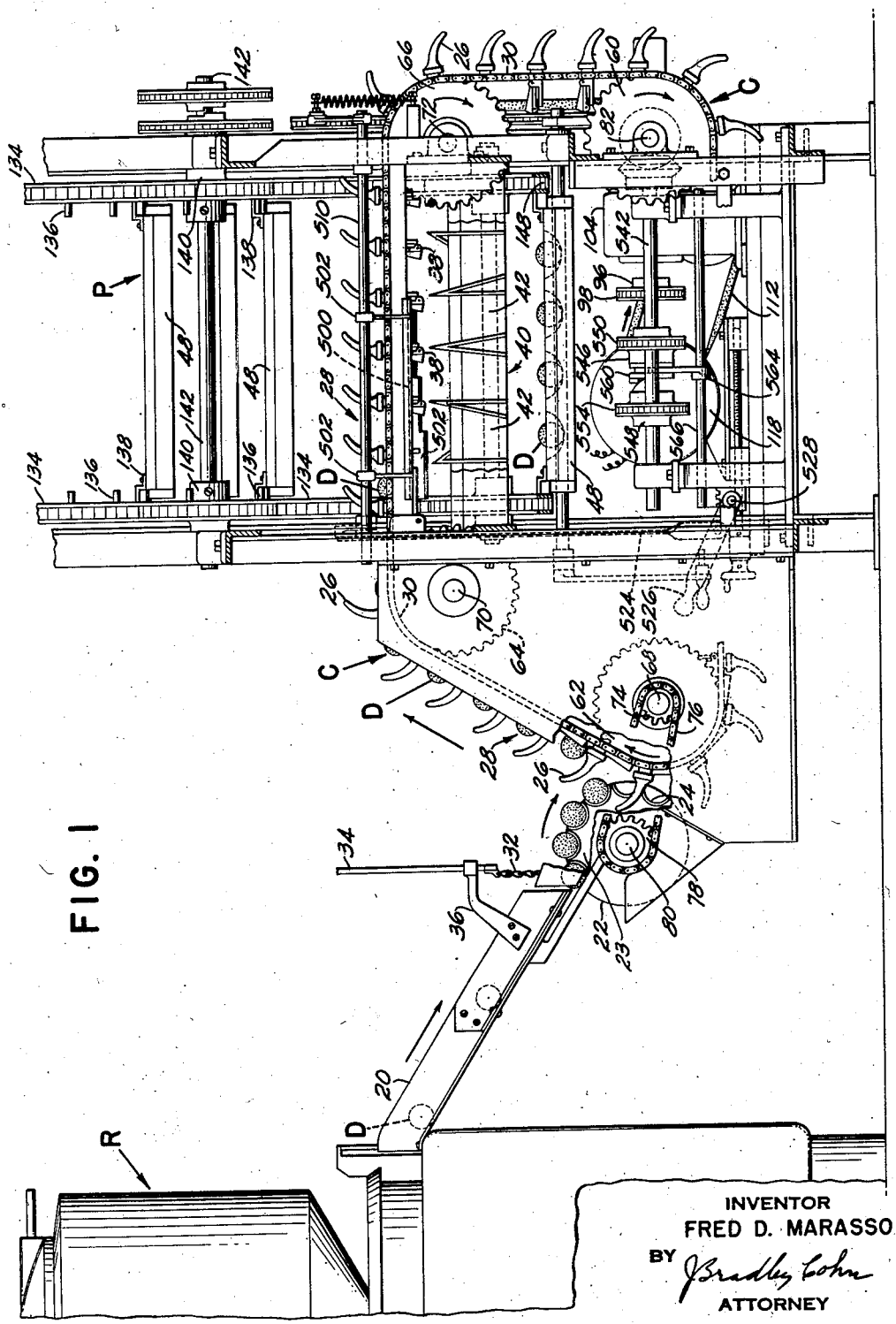
Fig. 1 is a partial side elevation of the feeding mechanism shown in conjunction with a dough divider and a portion of a proofer conveyor.

With reference to the drawings, the machine illustrated consists of a dough dividing and rounding machine R, a cross-feed conveyor C and a proofer conveyor P. It is obvious that the proofer conveyor is shown only for the purpose of illustration and could be any other conveyor on which it is desired to load a plurality of objects in transverse linear regimentation. The three units are designed to work together automatically and synchronously. The automatic dough dividing and rounding machine R, a portion of which is indicated in Fig. 1, is of well known design and construction and delivers successively rounded pieces of dough D into an inclined chute 20 leading to a horizontal rotating drum 22 which forms a part of the cross-feed conveyor C and represents the feeding station for the latter. The individual dough pieces D roll down the inclined chute 20 and into pockets 24 formed in drum 22. Since the latter continuously rotates in the direction of the arrow these dough pieces are transported to a position where they are successively removed from pockets 24 by means of suitably shaped fingers 26 which pass through annular slots or grooves 23 formed in drum 22 to remove the dough pieces D. Fingers 26 project from and form part of individual dough carriers 28 which are attached to and suspended between a pair of spaced endless chains 30 (Fig. 4) of conveyor C. As each individual dough piece rolls down chute 20 and contacts pocket 24 in the drum 22 it passes through a vertical chain mesh curtain 32 which is attached to and suspended from the L-shaped holder 34 adjustably held by a suitable bracket 36 secured to one of the side walls of the inclined chute 20. Chain mesh curtain 32 breaks the momentum of the dough pieces at the bottom of chute 20, wipes off excess flour, and acts as a separator for the individual dough lumps as they enter the individual pockets 24 of drum 22.

In order to properly synchronize the dough delivering and distributing drum 22 with the cross-feed conveyor C at the receiving station of the latter, the stud shaft 68 carries a sprocket 74 which through chain 76 (Fig. 1) drives sprocket 78 mounted on shaft 80 which supports and to which is secured the dough delivery drum 22.

As mentioned above, the cross-feed conveyor consists of a pair of spaced endless chains 30 to which are attached a plurality of spaced individual dough carriers 28. The latter are of the same design and construction as the dough carriers illustrated and described in my co-pending application, Serial No. 207,781, filed January 25, 1951, and now Patent No. 2,751,591. Each has a row of suitably shaped fingers 26 and a trap door 38. Carriers 28 pick up the dough pieces D from pockets of the drum 22 and transport them, first upwardly and then horizontally, to a gate structure 40 where several trap doors 38 simultaneously are released to drop their lumps of dough into respective dough compartments 42 of the gate structure 40. With this invention, however, each door 38 carries lateral pins 504 which project sideward from the same and ride on a cam rail 501 so that each door is kept closed from where it approaches the drum 22 to the lateral cam plate 500 or 502.

Figure 2:
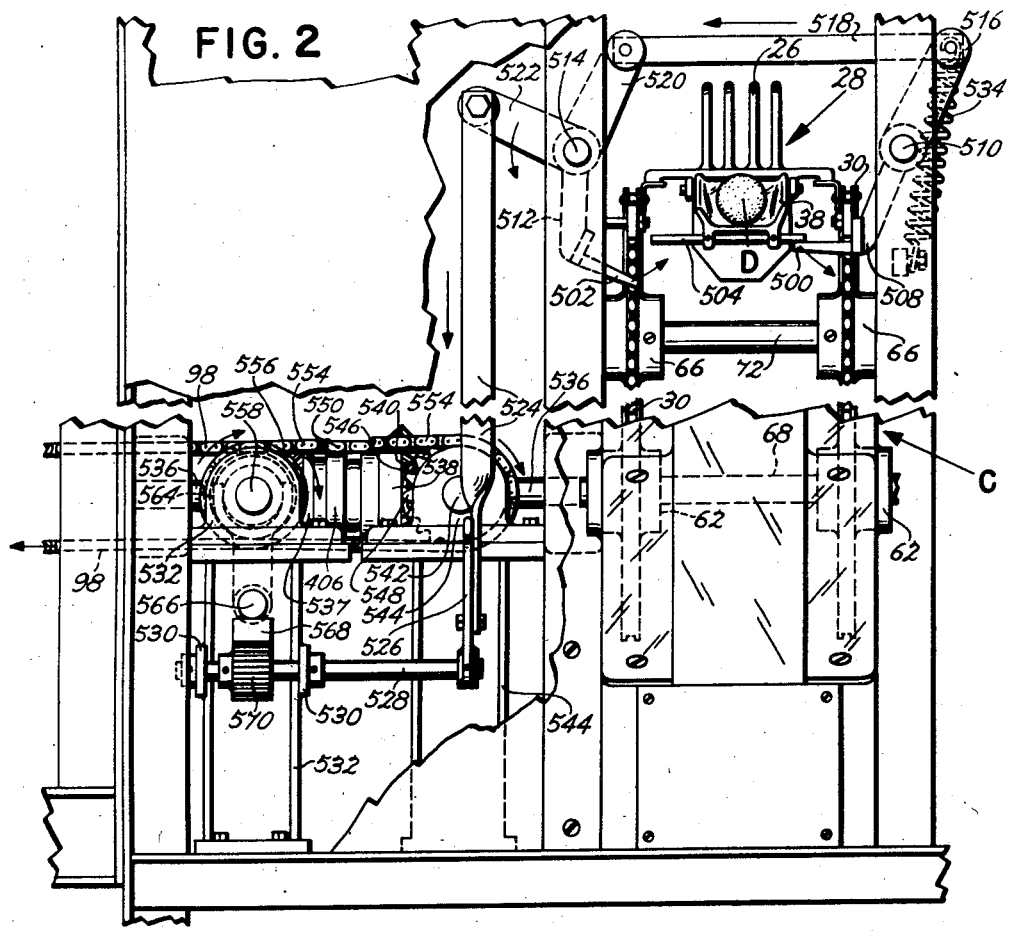
Fig. 2 is an end elevation partly in section.
Figure 4:
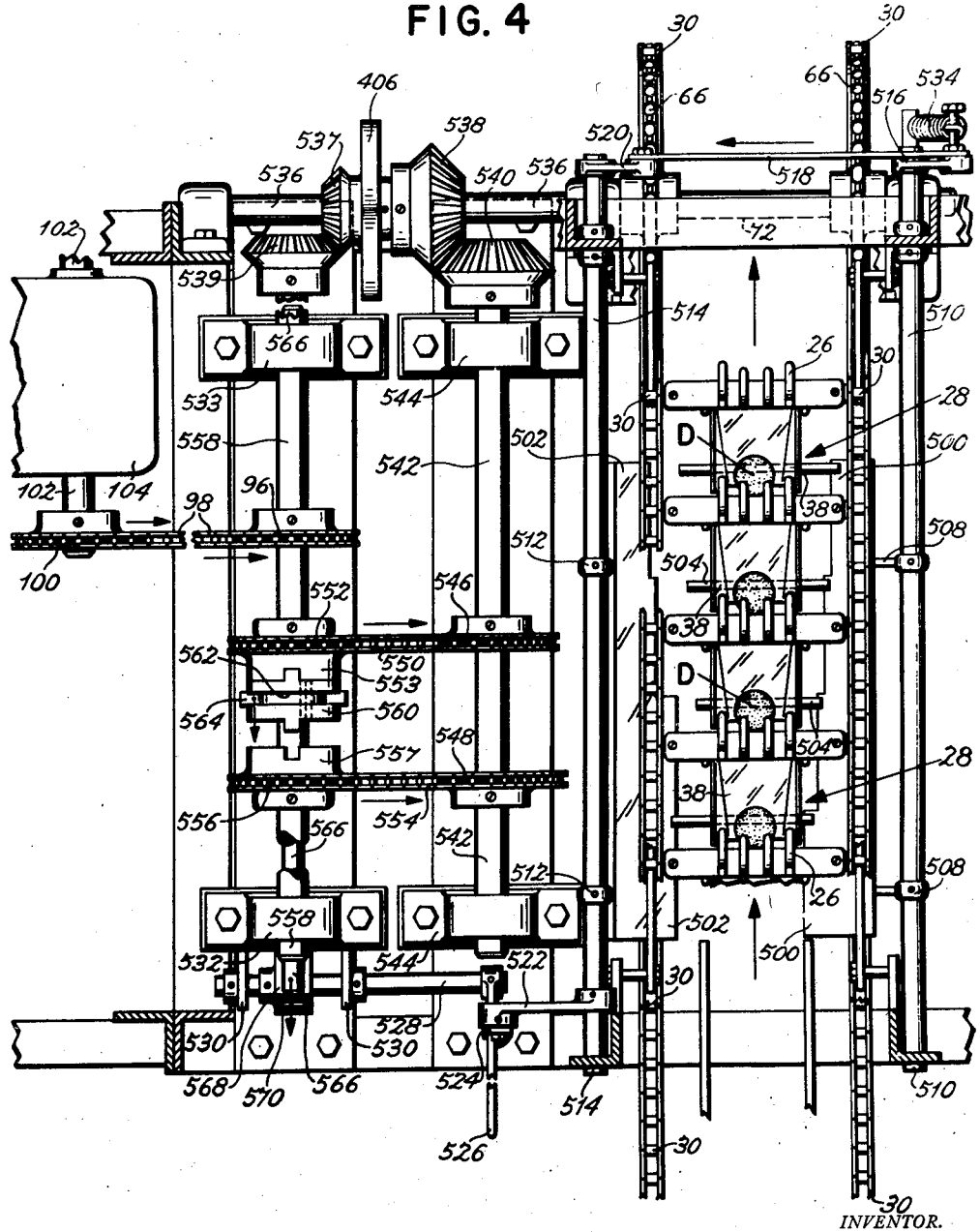
Fig. 4 is a plan view of the control and drive mechanism of the feed conveyor taken on the line 4—4 of Fig. 2.

As shown in Fig. 4, one lateral cam plate 500 has four steps and the other lateral cam plate 502 has three steps. It is understood that the apparatus could have any other desired number of steps in either cam plate 500 or 502. The cam plates 500, 502 are arranged and connected to each other in such a manner that when one plate is moved into operating position the other swings into an inoperative position (Figs. 2 and 4).

The pins 504 project from both sides of the hinged doors. The free ends are staggered at the right side as shown in Fig. 4 in groups of four different lengths and on the other side in groups of three different lengths, thus each group corresponds in staggered number to the number of steps on the cam plate on which it rides (Fig. 4). Thus when the four step cam plate to the right of Fig. 4 is in operating position four trap doors 38 open simultaneously while when the cam plate 502 is in operating position three doors 38 open simultaneously. The simultaneous opening of a predetermined number of doors, of course, means that a predetermined number of dough pieces are dropped simultaneously in transverse alignment onto any conveyor passing at right angles beneath.

Proofer conveyor P consists of a pair of spaced endless chains 134. To one side of each chain is secured a plurality of spaced studs or pins 136 arranged so that the pins of one chain are aligned with and point toward the pins of the other chain. Each aligned pair of pins pivotally engage with the end plates 138 of the tray 48 so that it remains level throughout the course of the endless conveyor. The tray conveyor chains 134 are driven by means of a pair of driving sprockets 140 mounted on a horizontal shaft 142 supported by suitable bearings attached to the main frame of the machine. By leading chains 134 over several pair of idler or guide sprockets (not shown) the tray conveyor makes several passes to secure proper proofing time. In the subject invention it is unimportant how the chains 134 go after passing the cross-feed conveyor C. Such structure is more particularly shown in Patent No. 2,750,899 of which this is a division and further description is not deemed necessary here. Suffice it to say that the chains make a run beneath the upper horizontal run of the cross-feed conveyor C and in a direction transverse thereto so that each tray 48 of conveyor P passes beneath the dough carriers 28 (Fig. 1) when they are passing over cam plate 500 or 502.

The cross-feed conveyor C is driven continuously by means of a pair of driving sprockets 60. The two spaced conveyor chains 30 supporting the dough carriers 28 are led over three pairs of intermediate or guide sprockets 62, 64, 66 mounted on stud shafts 68, 70 and 72, respectively, all of which are supported in suitable bearing brackets secured to the frame of the machine.

Figure 3:
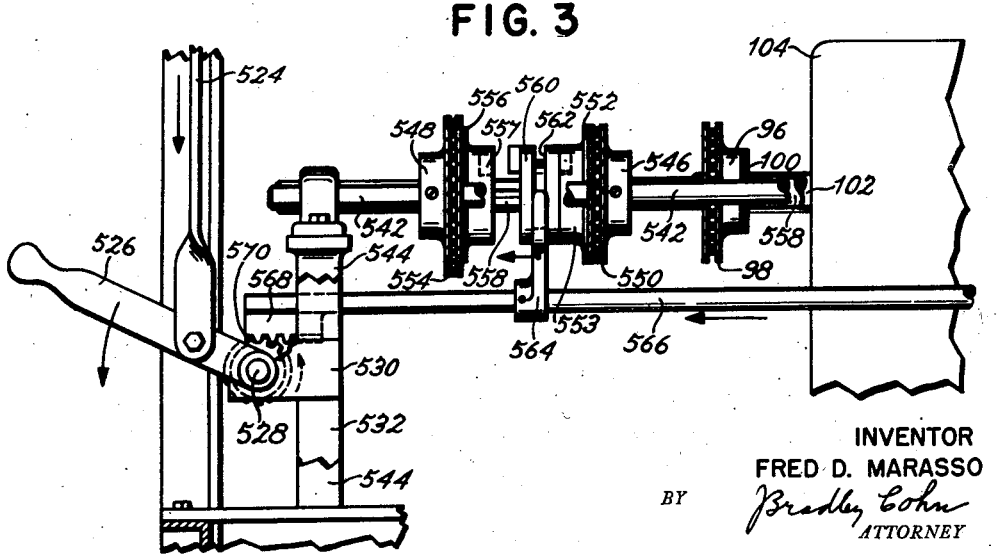
Fig. 3 is a view of the drive control mechanism.

The driving sprockets 60 for the conveyor chains 30 of the cross-feed conveyor C are mounted on a horizontal shaft 536 (Fig. 4) to which is secured a bevel gear 538 driven by a bevel gear 540 fastened to a shaft 542. The latter is supported by suitable bearing brackets 544 attached to the frame structure of the machine. To shaft 542 are also secured two sprockets 546, 548 which are of different diameters. Sprocket 546 by means of a chain 550 is connected to sprocket 552 while sprocket 548 by means of a chain 554 is connected to a sprocket 556. Sprockets 552 and 556 are loosely mounted on a shaft 558. Shaft 558 is continuously driven through a sprocket 96 connected by a chain 98 to a sprocket 100 mounted on a drive shaft 102 protruding from a gear reduction unit 104 driven by motor 118 through a belt 112. To shaft 558 is slidably keyed a clutch member 560 located between the spaced hubs 553 and 557 of sprockets 552 and 556, respectively. Each of said hubs is provided with a conventional female clutch face while the clutch member 560 is provided with two conventional male clutch faces. Said clutch member 560 is also provided with an annular groove 562 which engages with the forked end of a clutch actuating arm 564 secured to a shaft 566 (Figs. 3 and 4). The latter is slidably supported in suitable bushings (not shown) of bearing brackets 532, 533 which are also employed to support shaft 558. To one end of shaft 566 is also secured a gear track 568 which engages with a gear 570 mounted on shaft 528.

The four step cam plate 500 is supported by a plurality of arms 508 all of which are secured to a horizontal shaft 510 fulcrumed in suitable bearings of the frame structure. The three step cam plate 502 is supported by a plurality of arms 512 all of which are secured to a horizontal shaft 514 also fulcrumed in suitable bearings of the frame structure. To one end of the shaft 510 is secured an arm 516 which, by means of a link 518, is connected to an arm 520 mounted to shaft 514 (Fig. 2). To the latter is also secured another arm 522 which, by means of a link 524, is connected to a hand or control lever 526 mounted on a horizontal shaft 528 supported in suitable lugs 530 attached to a bracket 432.

It is readily apparent from the drawings that if lever 526 is moved upward the four step cam plate 502 is brought into operating position and the three step cam plate 502 is moved out of the path of the projecting pins 504 into inoperative position. Movement of the lever 526 downward brings the three step cam plate 502 into operating position and the four step cam plate 500 into inoperative position. A toggle spring 534 (Figs. 2 and 4) anchored at one end to the frame structure and hooked on the other end to arm 516 assures the proper arrest of cam plates 500 and 502 in either position.

Since control lever 526 is secured to shaft 528 to which is also secured the gear 570 it is apparent from the above description and illustration in Figs. 2, 3 and 4 that an up or down movement of lever 527 also causes a lateral shift of clutch member 560 which in turn effects an engagement with clutch face of either hub 553 or 557. Therefore, when lever 526 is in its upper position the four step cam plate 500 is in operation position and clutch member 560 is in engagement with hub 553 of sprocket 552 and imparts its driving rotation through sprocket 552, chain 550 and sprocket 546 to shaft 542 which through the formed connections drives the cross-feed conveyor chains 30 which carries the dough carrier 28.

It should be here mentioned that the speed reduction box 104 also drives the proofer conveyor P by means not here shown since that structure is fully described in my parent Patent No. 2,750,899, dated July 19, 1956. The particular structure of such driving means are not part of the subject invention.

Since the cross-feed conveyor C is ultimately driven by clutch plate 560 from the gear reduction unit 104, the purpose of the sprockets 552 and 556 becomes apparent. When the cross-feed conveyor is dropping units of three it must travel at a relatively lower speed than when it is dropping units of four. Thus in the upward position of lever 526 the speed of the conveyor chains 30 is timed and synchronized through sprockets 552 and 546 to drop four rounded dough pieces D simultaneously into tray 48 of the proofer conveyor as it passes beneath the dough carriers 28. However, when lever 526 is moved to its downward position and the three step cam plate is operating, only three dough pieces D drop into each conveyor tray. Drive to shaft 542 is then through sprockets 556 and 548. The diameter of sprocket 548 is slightly larger than that of sprocket 546 to provide greater reduction in the speed of the cross-feed conveyor chain 30.

Thus the speed change is automatically incorporated to operate from the cam selector 526.

It will be understood that my invention is not limited to the embodiments herein disclosed and that the terminology employed is for the purpose of description and not limitation. Applicant therefore does not wish to be limited beyond the scope of the appended claims.

I claim:

1. The combination with a proofer conveyor, of a cross-feed device to feed dough lumps to the proofing conveyor, said cross-feed comprising a pair of spaced endless chains positioned in parallel planes extending at right angles to the planes of the proofer conveyor, with the upper portions of said chains extending above a portion of the proofer conveyor, a plurality of dough carriers supported by and movable with said pair of chains, said dough carriers each comprising a plurality of outwardly extending spaced fingers and a movable dough supporting member, each of said dough supporting members being movable from a dough supporting position to a dough releasing position, a rotary dough receiving drum structure positioned adjacent the end portion of said chains provided with a plurality of spaced peripheral dough receiving recesses therein, said drum having a plurality of radially extending grooves therein between which the fingers of said dough carriers may successively pass to remove dough from said recesses, said dough supporting members having outwardly extending lugs on each side to hold said members in a dough supporting position when said lugs are engaged, the lugs on the one side of said members being staggered with respect to lugs of the other members in a group of a predetermined number, and the lugs on the other side being likewise staggered in groups but of different number, means to engage and support the lugs of one side and to simultaneously release a group of one number at a predetermined point, said means being movable into an inoperative position, means on the other side to engage and support said lugs and to simultaneously release members of the other numbered group, said means being movable to an inoperative position, a control connected to both of said supporting means to simultaneously move one supporting means into operative position and the other out of operative position, and unitary drive means to drive said cross feed device and said proofer conveyor, a drive linkage between said unitary drive means and said cross feed conveyor, transmission means in said drive linkage having two predetermined speed ratios, a clutch movable to engage the transmission means of higher ratio and to disengage that lower of the other ratio, and links between said control and said clutch whereby said clutch may be moved by said control.

2. The combination with a proofer conveyor, of a cross-feed device to feed dough lumps to the proofing conveyor, said cross-feed comprising a pair of spaced endless chains positioned in parallel planes extending at righ angles to the planes of the proofer conveyor, with the upper portions of said chains extending above a portion of the proofer conveyor, a plurality of dough supporting members supported by and movable with said pair of chains, each of said dough supporting members being movable from a dough supporting position to a dough releasing position, said dough supporting members having outwardly extending lugs on each side to hold said members in a dough supporting position when said lugs are engaged, the lugs on the one side of said members being staggered with respect to lugs of the other members in a group of a predetermined number, and the lugs on the other side being likewise staggered in groups but of different number, means to engage and support the lugs of one side and to simultaneously release a group of one number at a predetermined point, said means being movable into an inoperative position, means on the other side to engage and support said lugs and to simultaneously release members of the other numbered group, said means being movable to an inoperative position, a control connected to both of said supporting means to simultaneously move one supporting means into operative position and the other out of operative position, unitary drive means to drive said cross-feed conveyor and said proofer conveyor, a drive linkage between said unitary drive means and said cross-feed conveyor, transmission means in said drive linkage having two predetermined speed ratios, a clutch movable to engage the transmission means of one ratio and to disengage that of the other ratio, and links between said control and said clutch whereby said clutch may be moved by said control.

3. The combination with a proofer conveyor, of a cross-feed device to feed dough lumps to the proofing conveyor, said cross-feed comprising a pair of spaced endless chains positioned in parallel planes extending at right angles to the planes of the proofer conveyor, with the upper portions of said chains extending above a portion of the proofer conveyor, a plurality of dough supporting members supported by and movable with said pair of chains, each of said dough supporting members being movable from a dough supporting position to a dough releasing position, said dough supporting members having outwardly extending lugs on each side to hold said members in a dough supporting position when said lugs are engaged, the lugs on the one side of said members being staggered with respect to lugs of the other members in a group of a predetermined number, and the lugs on the other side being likewise staggered in groups but of different number, means to engage and support the fingers of one side and to simultaneously release a group of one number at a predetermined point, said means being movable into an inoperative position, means on the other side to engage and support said fingers and to simultaneously release members of the other numbered group, said means being movable to an inoperative position, a control connected to both of said supporting means to simultaneously move one supporting means into operative position and the other out of operative position, and drive means to drive said cross-feed device and said proofer conveyor.

4. The combination of a cross-feed conveyor for conveying dough lumps to a proofer conveyor, said cross-feed conveyor comprising endless spaced chains positioned in parallel planes extending at right angles to the plane of the proofer conveyor with a portion of said chains extending above a portion of the proofer conveyor, dough supporting members suspended between said chains, means to deposit one by one dough lumps into said dough supporting members, said proofer conveyor comprising a pair of spaced parallel endless chains, other dough supporting members supported transversely between said chains and capable of supporting a plurality of dough lumps on each member, means to release a predetermined number or first amount of dough lumps from a predetermined number of supporting members of the cross-feed conveyor to one of the other dough supporting members of the proofer conveyor, other means to release a different predetermined number or second amount of dough lumps from said cross-feed conveyor to said proofing conveyor, means to vary the relative rate of speed between said cross-feed conveyor and said proofer conveyor as the proportion of the first amount to the second amount, and further means to selectively employ one or the other of said releasing means and simultaneously the respective rate of speed.

5. In combination with a conveyor, a cross-feed device arranged to pass transversely across a portion of said conveyor, said cross-feed device comprising a pair of spaced endless chains positioned in parallel planes and at least a portion of said chains extending across said conveyor, a plurality of dough carriers supported by and movable with said chains, said dough carriers each comprising a plurality of outwardly extending spaced fingers, each having a movable dough supporting member, each of said dough supporting members being movable from a dough supporting position to a dough releasing position, outwardly extending lugs secured to each side of said members in a dough supporting position to hold said members in a dough supporting position when said lugs are engaged, the lugs on the one side of said members being staggered with respect to the lugs of the other members in a group of a predetermined number, the lugs on the other side being likewise staggered but in groups of a different number, means to engage and support the lugs of one side to simultaneously release a group of one number at a predetermined point along a portion of said chains passing over said conveyor, said means being movable into an inoperative position, further means on the other side to engage and support said lugs and to simultaneously release the members of the other numbered group, said further means being movable to an inoperative position, a control connected to both of said supporting means to simultaneously move one supporting means into operative position and the other out of operative position, and synchronous drive means to drive said cross-feed device and said conveyor.

6. In combination with a conveyor, a cross-feed device arranged to pass transversely across a portion of said conveyor, said cross-feed device comprising a pair of spaced endless chains positioned in parallel planes and at least a portion of said chains extending across said conveyor, a plurality of dough carriers supported by and movable with said chains, said dough carriers each comprising a plurality of outwardly extending spaced fingers, each having a movable dough supporting member, each of said dough supporting members being movable from a dough supporting position to a dough releasing position, outwardly extending lugs secured to each side of said members in a dough supporting position to hold said members in a dough supporting position when said lugs are engaged, the lugs on the one side of said members being staggered with respect to the lugs of the other members in a group of a predetermined number, the lugs on the other side being likewise staggered but in groups of a different number, means to engage and support the lugs of one side to simultaneously release a group of one number at a predetermined point along a portion of said chains passing over said conveyor, said means being movable into an inoperative position, further means on the other side to engage and support said lugs and to simultaneously release the members of the other numbered group, said further means being movable to an inoperative position, a control connected to both of said supporting means to simultaneously move one supporting means into operative position and the other out of operative position, synchronous drive means to drive said cross-feed device and said conveyor, a drive linkage between said unitary drive means and said cross-feed device, transmission means in said drive linkage having two predetermined speed ratios, a clutch movable to engage the transmission means of higher ratio and to disengage the transmission means of the lower ratio, and a link between said control and said clutch whereby said clutch may be moved by said control when said control is moved to alternate said supporting means.

7. A cross-feed device suitable for feeding a plurality of objects in linear alignment to a conveyor, said cross-feed comprising a device having a pair of spaced endless chains positioned in parallel planes, a plurality of dough supporting members supported by and movable with said pairs of chains, each of said dough supporting members being movable from a dough supporting position to a dough releasing position, said dough supporting members having outwardly extending lugs on each side to hold said members in a dough supporting position when said lugs are engaged, the lugs on the one side of said members being staggered with respect to the lugs of the other members in a group of a predetermined number, and the lugs on the other side being likewise staggered in groups but of different number, means to engage and support the lugs of one side to simultaneously release a group of one number at a predetermined point, said means being movable into an inoperative position, similar means on the other side to engage and support said lugs and to simultaneously release a group of the other number, said similar means being movable to an inoperative position, a control connected to both of said supporting means to simultaneously move one supporting means into operative position and the other out of operative position, drive means to drive said cross-feed device, a drive linkage between said drive means and said cross-feed device, transmission means in said drive linkage having two predetermined speed ratios, and a clutch movable to engage the transmission means of one ratio and to disengage that of the other ratio, said clutch being operatively connected to said control to be operated thereby so that said device may deposit a selectively predetermined number of articles at a predetermined rate of speed.

8. A cross-feed device suitable for feeding a plurality of objects in linear alignment to a conveyor, said cross-feed comprising a device having a pair of spaced endless chains positioned in parallel planes, a plurality of dough supporting members supported by and movable with said pairs of chains, each of said dough supporting members being movable from a dough supporting position to a dough releasing position, said dough supporting members having outwardly extending lugs on each side to hold said members in a dough supporting position when said lugs are engaged, the lugs on the one side of said members being staggered with respect to the lugs of the other members in a group of a predetermined number, and the lugs on the other side being likewise staggered in groups but of different number, means to engage and support the lugs of one side to simultaneously release a group of one number at a predetermined point, said means being movable into an inoperative position, similar means on the other side to engage and support said lugs and to simultaneously release a group of the other number, said similar means being movable to an inoperative position, and a control connected to both of said supporting means to simultaneously move one supporting means into operative position and the other out of operative position.

9. In combination with a conveyor for advancing a series of articles in linear alignment, a cross-feed device to feed articles in said transverse linear alignment to said conveyor, said cross-feed comprising a pair of spaced endless chains positioned in parallel planes extending at right angles to the planes of the conveyor, at least one portion of said chains extending above a portion of said conveyor, a plurality of article supporting members supported by and movable with said pair of chains, each of said article supporting members being movable from an article supporting position to an article releasing position, said article supporting members having outwardly extending lugs on each side to hold said members in an article supporting position when said lugs are engaged, the lugs on the one side of said members being staggered with respect to the lugs of the other members in a group of a predetermined number, and the lugs on the other side being likewise staggered in groups of different number, means to engage and support the fingers of one side to simultaneously release a group of one number at a predetermined point, said means being movable into an inoperative position, means on the other side to engage and support said fingers to simultaneously release members of the other numbered group, said means being movable to an inoperative position, a control connected to both of said supporting means to simultaneously move one supporting means into operative position and the other out of operative position, and drive means to drive said cross-feed device and said conveyor.

10. The combination of a cross-feed device for conveying articles to a conveyor, said cross-feed device comprising endless spaced chains positioned in parallel planes extending at right angles to the plane of the conveyor with a portion of said chains extending above a portion of the conveyor, article supporting members suspended between said chains, means to deposit one by one articles into said dough supporting members, means to release a predetermined number or first amount of articles from a predetermined number of supporting members of the cross-feed device to the conveyor, other means to release a different predetermined number or second amount of articles from said cross-feed device to said conveyor, means to vary the relative rate of speed between said cross-feed device and said conveyor as the proportion of the first amount to the second amount, and further means to selectively employ one or the other of said releasing means and simultaneously the respective rate of speed.

11. A conveying device for advancing a plurality of objects in linear alignment and simultaneously delivering a predetermined number at a delivering station, said device comprising advancing mechanism for advancing a plurality of article supporting members, each of said article supporting members being movable on said advancing mechanism from an article supporting position to an article delivering position, said article supporting members having outwardly extending lugs on each side to hold said members in an article supporting position when said lugs are engaged, the lugs on the one side of said members being staggered with respect to the lugs of the other members in groups of predetermined number, the lugs on the other side being likewise staggered in groups of a different number, means to engage and support the lugs of one side to simultaneously release a group of said one number at said station, said means being movable into an inoperative position, similar means on the other side to engage and support said lugs to simultaneously release a group of the other number, said similar means being movable to an inoperative position, and a control connected to said means and said similar means to simultaneously move one of said means into operative position and the other of said means out of operative position.

12. A conveying device for advancing a plurality of objects in linear alignment and simultaneously delivering a predetermined number at a delivering station, said device comprising advancing mechanism for advancing a plurality of article supporting members, each of said article supporting members being movable on said advancing mechanism from an article supporting position to an article delivering position, said article supporting members having outwardly extending lugs on each side to hold said members in an article supporting position when said lugs are engaged, the lugs on the one side of said members being staggered with respect to the lugs of the other members in groups of predetermined number, the lugs on the other side being likewise staggered in groups of a different number, means to engage and support the lugs of one side to simultaneously release a group of said one number at said station, said means being movable into an inoperative position, similar means on the other side to engage and support said lugs to simultaneously release a group of the other number, said similar means being movable to an inoperative position, a control connected to said means and said similar means to simultaneously move one of said means into operative position and the other of said means out of operative position, drive means to drive said advancing mechanism, a drive linkage between said drive means and said advancing mechanism, transmission means in said drive linkage having two predetermined speed ratios, and a shift member to engage said transmission means of one ratio and to disengage that of the other ratio, said shift member being operatively connected to said control to vary the speed ratios of said transmission in accordance with the means selected by said control.

References Cited in the file of this patent

UNITED STATES PATENTS

| 1,343,184 | Baker et al. | June 8, 1920 |
| 2,704,177 | Neaves | Mar. 15, 1955 |